United States Patent
Chen et al.

(10) Patent No.: US 10,425,403 B2
(45) Date of Patent: Sep. 24, 2019

(54) METHOD AND DEVICE FOR ACCESSING SMART CAMERA

(71) Applicant: Beijing Xiaomi Mobile Software Co., Ltd., Beijing (CN)

(72) Inventors: Hong Chen, Beijing (CN); Ziguang Gao, Beijing (CN); Enxing Hou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 158 days.

(21) Appl. No.: 15/394,264

(22) Filed: Dec. 29, 2016

(65) Prior Publication Data
US 2017/0272425 A1   Sep. 21, 2017

(30) Foreign Application Priority Data
Mar. 18, 2016 (CN) .......................... 2016 1 0158947

(51) Int. Cl.
*H04L 29/06* (2006.01)
*H04L 9/32* (2006.01)
*H04L 29/08* (2006.01)

(52) U.S. Cl.
CPC .......... *H04L 63/083* (2013.01); *H04L 9/3213* (2013.01); *H04L 9/3226* (2013.01); *H04L 63/0846* (2013.01); *H04L 63/108* (2013.01); *H04L 67/125* (2013.01)

(58) Field of Classification Search
None
See application file for complete search history.

(56) References Cited

U.S. PATENT DOCUMENTS

| | | |
|---|---|---|
| 6,993,658 B1 * | 1/2006 | Engberg .................. G06F 21/43 379/114.2 |
| 9,179,105 B1 | 11/2015 | Zeira et al. |
| 2015/0022666 A1 | 1/2015 | Key et al. |
| 2015/0163462 A1 * | 6/2015 | Brockway, III .... H04N 5/23206 348/158 |

(Continued)

FOREIGN PATENT DOCUMENTS

| | | |
|---|---|---|
| CN | 104202306 A | 12/2014 |
| CN | 104243250 A | 12/2014 |
| CN | 104639549 A | 5/2015 |

(Continued)

OTHER PUBLICATIONS

Extended European Search Report for European Application No. 17161297.1-1870, dated Aug. 1, 2017.

(Continued)

*Primary Examiner* — Andrew J Steinle
(74) *Attorney, Agent, or Firm* — Finnegan, Henderson, Farabow, Garrett & Dunner LLP

(57) ABSTRACT

The present disclosure relates to a method and a device for accessing a smart camera. The method includes detecting access media for accessing the smart camera. The method also includes generating an access request corresponding to the access media when detecting that the access media is a local area network. The access request carries an access password. The method further includes sending the access request to the smart camera, such that the smart camera allows access after successfully verifying the access password in the access request.

8 Claims, 20 Drawing Sheets

(56) References Cited

U.S. PATENT DOCUMENTS

2015/0222601 A1\* 8/2015 Metz .................. H04L 63/04
726/9

FOREIGN PATENT DOCUMENTS

| CN | 104868997 A | 8/2015 |
| CN | 105243318 A | 1/2016 |
| CN | 105245596 A | 1/2016 |
| CN | 105278337 A | 1/2016 |
| CN | 105282159 A | 1/2016 |
| CN | 105357262 A | 2/2016 |
| CN | 106209816 A | 12/2016 |
| JP | 2014-154131 A | 8/2014 |
| JP | 2015-122671 A | 7/2015 |

OTHER PUBLICATIONS

Extended European Search Report dated Aug. 1, 2017, in counterpart European Patent Application No. 17161297.1.
International Search Report issued by the State Intellectual Property Office (SIPO) of the People's Republic of China dated Nov. 30, 2016, in PCT International Application No. PCT/CN2016/092867.
Japanese Office Action dated Oct. 2, 2018, in counterpart Japanese Application No. 2017-544782.
First Office Action issued by the State Intellectual Property Office (SIPO) of the People's Republic of China dated Jul. 4, 2018, in counterpart Chinese Application No. 201610158947.4.

\* cited by examiner

METHOD AND DEVICE FOR ACCESSING SMART CAMERA

CROSS REFERENCE TO RELATED APPLICATION

This application is based upon and claims priority to Chinese Patent Application Serial No. 201610158947.4, filed with the State Intellectual Property Office of P. R. China on Mar. 18, 2016, the entire contents of which are incorporated herein by reference.

TECHNICAL FIELD

The present disclosure generally relates to the field of network communication technology, and more particularly, to a method and device for accessing a smart camera.

BACKGROUND

With the increasing development of network communication technologies, smart cameras for video surveillance are being widely used. In the related art, a user may access a smart camera through the Internet at any time, which makes it convenient for the user to perform video surveillance. However, if a user terminal cannot access the Internet, it cannot access the smart camera, which increases the difficulty for the user to access the smart camera.

SUMMARY

In order to overcome problems existing in the related art, embodiments of the present disclosure provide a method and device for accessing a smart camera.

According to a first aspect of embodiments of the present disclosure, a method for accessing a smart camera is provided. The method includes detecting access media for accessing the smart camera. The method also includes generating an access request corresponding to the access media when detecting that the access media is a local area network. The access request carries an access password. The method further includes sending the access request to the smart camera, such that the smart camera allows access after successfully verifying the access password in the access request.

According to a second aspect of embodiments of the present disclosure, a method for accessing a smart camera is provided. The method includes receiving an access request sent by a terminal through a local area network. The access request carries an access password. The method also includes verifying the access password. The method further includes allowing access by the terminal if the access password is successfully verified.

According to a third aspect of the present disclosure, a device for accessing a smart camera is provided. The device includes a processor and a memory configured to store instructions executable by the processor. The processor is configured to detect access media for accessing the smart camera. The processor is also configured to generate an access request corresponding to the access media when detecting that the access media is a local area network. The access request carries an access password. The processor is further configured to send the access request to the smart camera, such that the smart camera allows access after successfully verifying the access password in the access request.

It is to be understood that both the foregoing general description and the following detailed description are exemplary and explanatory only and are not restrictive of the present disclosure.

BRIEF DESCRIPTION OF THE DRAWINGS

The drawings shown herein, which are incorporated in and constitute a part of the specification, illustrate embodiments of the present disclosure and are used for explaining the principles of the present disclosure together with the specification.

DETAILED DESCRIPTION

Figure 1:
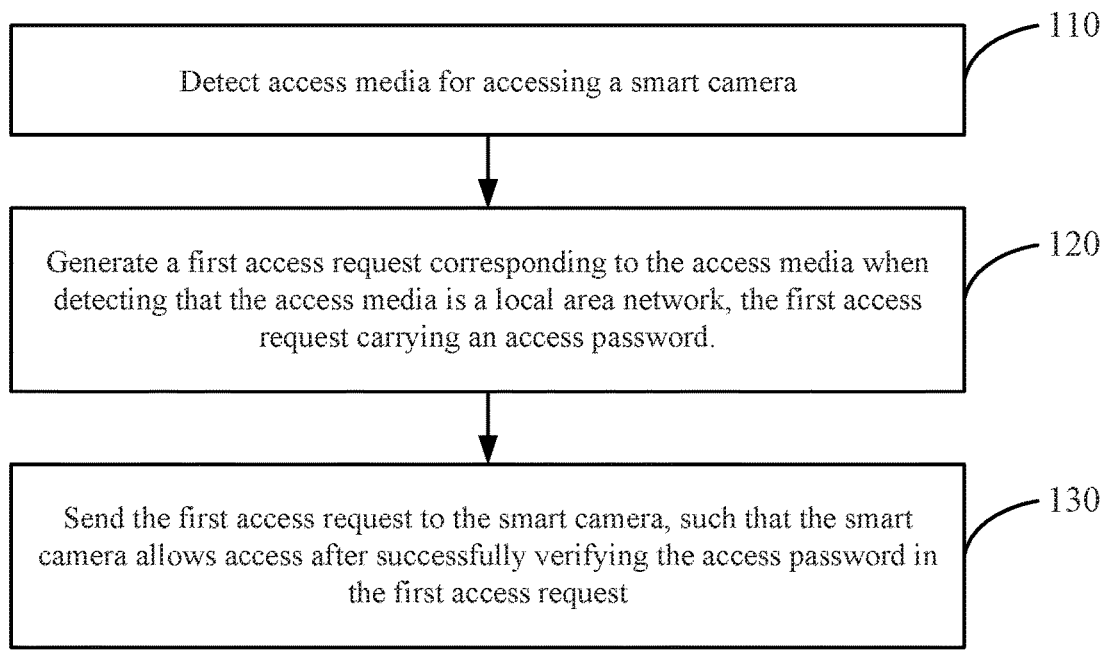
FIG. 1 is a flowchart illustrating a method for accessing a smart camera according to an exemplary embodiment of the present disclosure.

Exemplary embodiments will be described in detail, and examples thereof are shown in the accompanying drawings. In the following description of the drawings, unless specified or limited otherwise, the same or similar elements having the same or similar functions are denoted by the same reference numerals. The implementations described in the following embodiments do not represent all implementations of the present disclosure. Instead, they are merely examples of the devices and methods described in the appended claims, consistent with some aspects of the present disclosure.

Terms used in the following description are only for the purpose of describing specific embodiments, and should not be construed to limit the present disclosure. As used in the description of the present disclosure and the appended claims, "a" and "the" in singular forms are also intended to include plural forms, unless clearly indicated in the context otherwise. It should also be understood that the term "and/or," as used herein, represents and contains any one and all possible combinations of one or more associated items.

Although terms such as "first", "second," and "third" are used herein for describing various elements, these elements should not be limited by these terms. These terms are used only for distinguishing one element from another element. For example, a first sequencing criterion may also be called a second sequencing criterion, and likewise, the second sequencing criterion may also be called the first sequencing criterion, without departing from the scope of the present disclosure. Depending on the context, the term "if," as used herein, may be construed as "when," "upon," "in response to determining," "in accordance with a determination," or "in response to detecting," that a stated condition precedent is true.

FIG. 1 shows a flowchart illustrating a method for accessing a smart camera according to an exemplary embodiment of the present disclosure. As shown in FIG. 1, the method may be implemented in or by a terminal and includes the following steps.

In step 110, access media for accessing a smart camera is detected.

The terminal may be any smart terminal that can access the Internet, such as a mobile phone, a tablet PC, and a personal digital assistant. The terminal may access a router through a wireless local area network, and further access a server on a public network through the router.

The access media may be the Internet, or the local area network.

In an embodiment of the present disclosure, the terminal accesses the smart camera, so as to monitor videos captured by the smart camera or to adjust or control performance of the smart camera.

In step 120, a first access request corresponding to the access media is generated when detecting that the access media is a local area network, the first access request carrying or including an access password.

In an embodiment of the present disclosure, there is provided a safe access authentication mechanism based on local devices, which is used when the terminal and the smart camera are located in the same local area network but cannot access the Internet. In the access authentication mechanism based on local devices, the terminal and the smart camera perform an authentication by adopting a password verification method. Accordingly, the access request sent by the terminal to the smart camera carries the access password.

In step 130, the first access request is sent to the smart camera, such that the smart camera allows access after successfully verifying the access password included in the first access request.

In the above embodiment, by detecting the access media for accessing the smart camera, generating the corresponding first access request carrying the access password when detecting that the access media is a local area network, and sending the first access request to the smart camera to enable the smart camera to allow access after the access password in the first access request is successfully verified by the smart camera, the smart camera may be accessed by adopting an access authentication mechanism based on local devices, when the terminal and the smart camera are located in the same local area network but cannot access the Internet. In the disclosed embodiment, safety of accessing the smart camera is improved, user's personal requirement for accessing the smart camera is satisfied, and user experience is improved.

Figure 2:
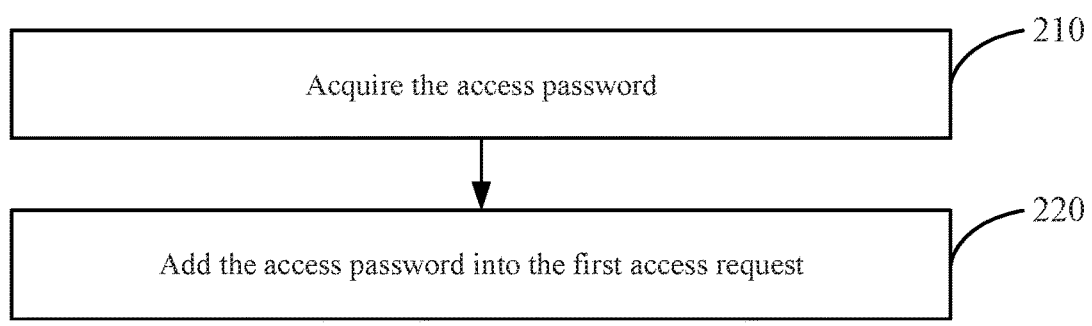
FIG. 2 is a flowchart illustrating another method for accessing a smart camera according to an exemplary embodiment of the present disclosure.

FIG. 2 is a flowchart illustrating another method for accessing a smart camera according to an exemplary embodiment of the present disclosure. The method may be implemented in or by a terminal, and is based on the method shown in FIG. 1. As shown in FIG. 2, the step 120 shown in FIG. 1 for generating the corresponding first access request carrying the access password includes the following steps.

In step 210, the access password is acquired.

In an embodiment of the present disclosure, the access password may be a password preset by the terminal, a password input by a user, or a password issued by a server.

The method of acquiring the access password includes, but is not limited to, the following two methods.

In a first method, the access password is an access password input by the user, which may be acquired according to the following steps:

(1) an access password input interface is displayed.

(2) the access password input by the user through the access password input interface is received.

In addition, in the first method, before accessing the smart camera, an appointed password is set between the terminal and the smart camera, and the appointed password is sent to the smart camera, such that the smart camera stores the appointed password, and allows access after determining that the appointed password is the same as the access password input by the user and included in the first access request.

In an embodiment of the present disclosure, when the Internet is accessible, the terminal may send the appointed password to the smart camera in advance via the Internet, such that the appointed password may be used later when the terminal and the smart camera are located in the same local area network but cannot access the Internet. The appointed password may be a password specified by the user.

In a second method, the access password is a token issued by the server, and may be acquired according to the following steps:

(1) the token issued by the server is acquired.

(2) the token is determined as the access password. In addition, in the second method, when the Internet is accessible, the terminal may receive the token issued by the server, and update a stored token with the newly received token, such that the access password carried in the first access request is the newly received token. The token may be a piece of string randomly generated by the server according to a password acquiring request of the smart camera. The string may be sent to the smart camera and the terminal respectively, and stored by the smart camera and the terminal. In addition, the token has a validity period. For example, if the validity period of the token is an hour, the token loses its efficacy an hour later.

In step 220, the access password is added into the first access request.

In the above embodiment, the access password may be acquired in various manners. The acquired access password is added into the first access request and used by the smart camera for performing a security verification. The access password may be a password preset by the terminal, a password input by the user, or a password issued by the server, such that the scope of the sources of the access password is expanded, thereby improving the efficiency and availability of accessing the smart camera.

Figure 3:
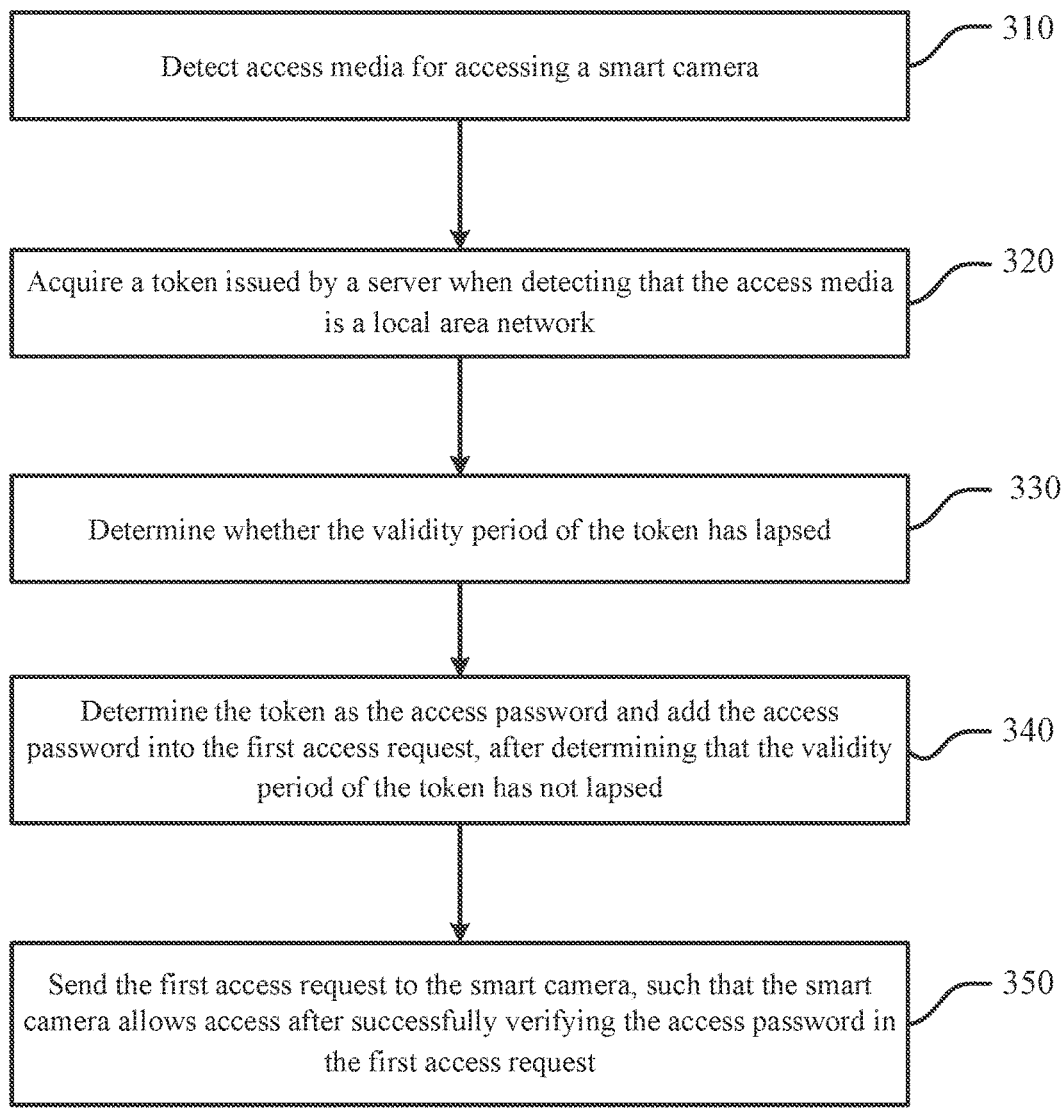
FIG. 3 is a flowchart illustrating another method for accessing a smart camera according to an exemplary embodiment of the present disclosure.

FIG. 3 is a flowchart illustrating another method for accessing a smart camera according to an exemplary embodiment of the present disclosure. The method may be implemented in or by a terminal. The method shown in FIG. 3 is based on the method shown in FIG. 1, and includes the following steps.

In step 310, access media for accessing a smart camera is detected.

In step 320, a token issued by a server is acquired when detecting that the access media is a local area network.

In an embodiment of the present disclosure, the method of triggering the server to issue the token includes, but is not limited to, the following two methods.

In a first method, the smart camera may periodically send a password acquiring request to the server. After receiving the password acquiring request sent by the smart camera, the server may randomly generate a piece of string as the token, and send the token to each of the terminal and the smart camera (e.g., simultaneously).

For example, the smart camera may send the password acquiring request to the server once every hour.

In a second method, the server may periodically generate the token, and send the token to each of the terminal and the smart camera (e.g., simultaneously).

For example, the server may issue the token to the terminal and the smart camera once every hour. A validity period of the token would be one hour.

According to the above disclosed embodiment, the token received by the terminal may be randomly generated by the server after the server receives the password acquiring request sent by the smart camera. The token may be sent by the server to each of the terminal and the smart camera (e.g., simultaneously). Alternatively, the token may be periodically generated by the server and sent by the server to each of the terminal and the smart camera (e.g., simultaneously).

The server sends the token to each of the terminal and the smart camera (e.g., simultaneously), such that after the terminal receives the token, the terminal configures the token as the access password when accessing the smart camera.

In addition, the terminal may also receive the validity period of the token issued by the server after receiving the token issued by the server.

In step 330, it is determined whether the validity period of the token has lapsed.

In step 340, after determining that the validity period of the token has not lapsed, the token is determined as the access password and the access password is added into the first access request.

In an embodiment of the present disclosure, if the validity period of the token has not lapsed, which indicates that the token is still valid, the token may be determined as the access password. If the validity period of the token has lapsed, which indicates that the token is invalid, the token cannot be determined as the access password.

In one embodiment, the validity period of the token issued by the server is one hour. If the smart camera is accessed during the validity period, the token may be used as the access password. If the validity period has lapsed, the terminal cannot access the smart camera through the local area network. The terminal waits for a new token to be issued by the server, and acquires the new token after accessing the Internet.

In step 350, the first access request is sent to the smart camera, such that the smart camera allows access after successfully verifying the access password in the first access request.

In the above embodiment, the access media for accessing the smart camera is detected, and the token issued by the server is acquired when detecting that the access media is a local area network. In addition, it is determined whether the validity period of the token has lapsed. If the validity period of the token has not lapsed, the token is determined as the access password, and the access password is added into the first access request. The first access request is sent to the smart camera, such that after the validity period of the token has lapsed, the terminal cannot access the smart camera through the local area network. The terminal waits for another valid token to be issued by the server, and acquires the new valid token after accessing the Internet. The disclosed embodiment improves safety and reliability of accessing the smart camera.

Figure 4:
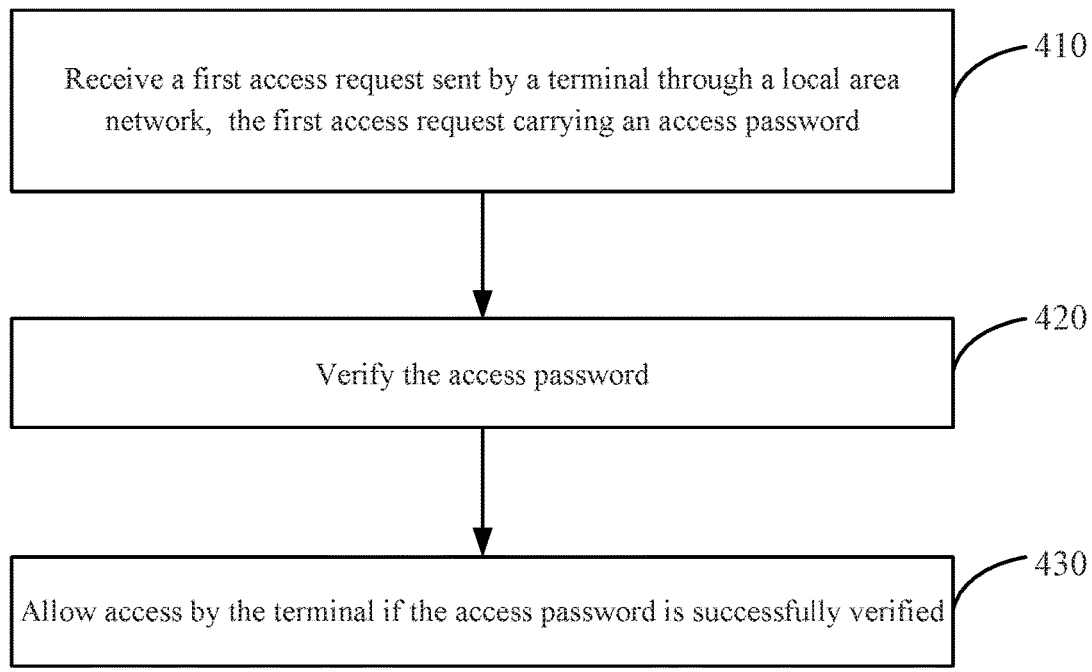
FIG. 4 is a flowchart illustrating another method for accessing a smart camera according to an exemplary embodiment of the present disclosure.

FIG. 4 is a flowchart illustrating another method for accessing a smart camera according to an exemplary embodiment of the present disclosure. The method may be implemented in or by a smart camera. The smart camera is a smart camera to be accessed. The method includes the following steps.

In step 410, a first access request sent by a terminal is received through a local area network. The first access request carries or includes an access password. The access password may be a password preset by the terminal, a password input by a user, or a password issued by a server.

In step 420, the access password is verified.

The method of verifying the access password includes, but is not limited to, the following two methods.

In a first method, the access password may be the password preset by the terminal or the password input by the user. The verification process may include the following steps.

(1) it is determined whether the access password is the same as an appointed password stored locally.

(2) if the access password is the same as the appointed password, it is determined that the access password is successfully verified.

In addition, in the first method, the smart camera may receive the appointed password sent by the terminal in advance. The appointed password may be appointed between the terminal and the smart camera. Moreover, the appointed password may be set by the terminal according to actual situations, or may be specified by the user.

In a second method, the access password is the password issued by the server, which may be verified according to the following steps.

(1) it is determined whether the access password is the same as a token stored locally, the token being the password issued by the server.

(2) if the access password is the same as the token, it is determined that the access password is successfully verified.

In addition, in the second method, the smart camera may send a password acquiring request to the server, receive and store the token issued by the server, and update the stored token with a newly received token when storing the token. The token may be a piece of string randomly generated by the server according to the password acquiring request received from the smart camera. The token may be sent to the smart camera and the terminal, respectively, such that the smart camera and the terminal store the token. The token has a validity period. For example, if the validity period of the token is one hour, the token becomes invalid after the one hour period lapses.

In step 430, access by the terminal is allowed if the access password is successfully verified.

In the above embodiment, by receiving the first access request carrying the access password sent by the terminal through a local area network, verifying the access password, and allowing the access by the terminal if the access password is successfully verified, the first access request may be verified by adopting an access authentication mechanism based on local devices, when the smart camera and the terminal are located in the same local area network but cannot access the Internet. In the disclosed embodiment, safety of accessing the smart camera is improved, user's personal requirement for accessing the smart camera is satisfied, and user experience is improved.

Figure 5:
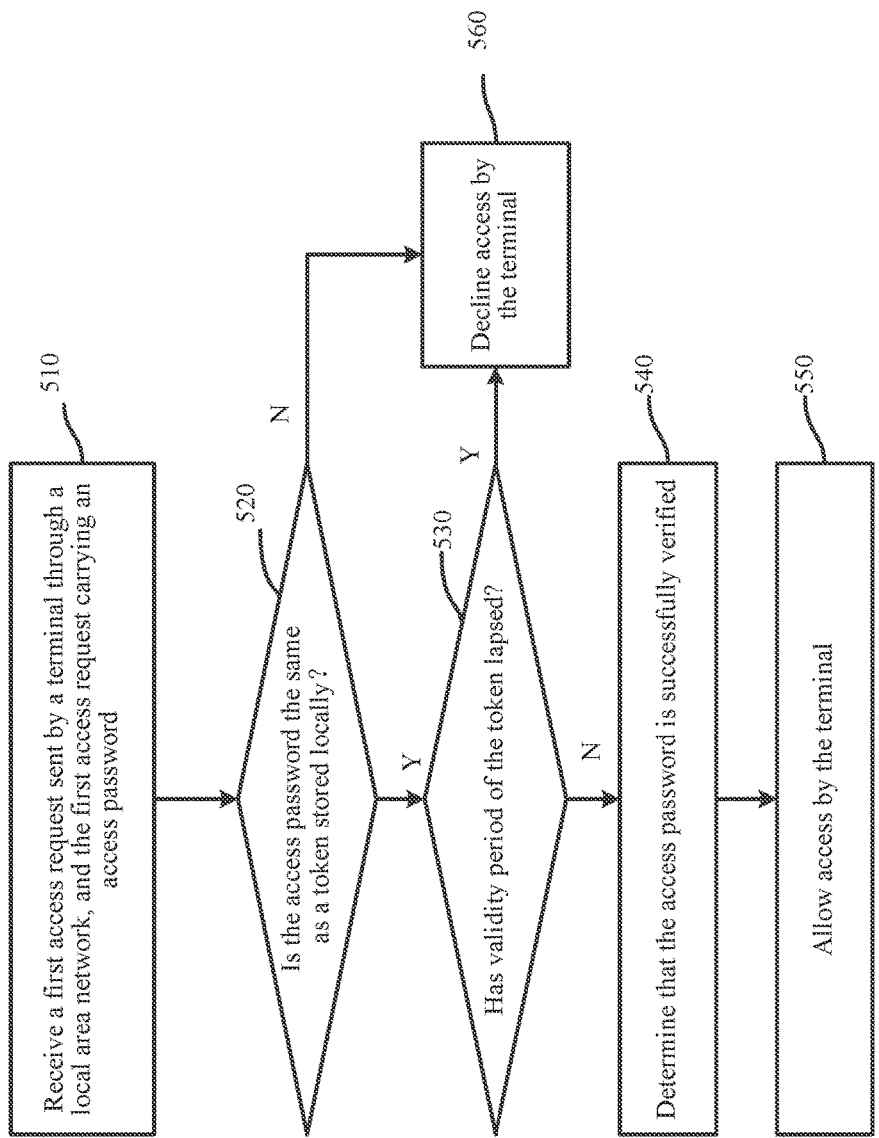
FIG. 5 is a flowchart illustrating another method for accessing a smart camera according to an exemplary embodiment of the present disclosure.

FIG. 5 is a flowchart illustrating another method for accessing a smart camera according to an exemplary embodiment of the present disclosure. The method may be implemented in or by a smart camera. The method shown in FIG. 5 is based on the method shown in FIG. 4, and includes the following steps.

In step 510, a first access request sent by a terminal is received through a local area network, the first access request carrying or including an access password.

In step 520, it is determined whether the access password is the same as a token stored locally. The token is a password issued by a server. If the access password is the same as the stored token, step 530 is executed; otherwise, step 560 is executed.

In an embodiment of the present disclosure, the method of triggering the server to issue the token includes, but is not limited to, the following two methods.

In a first method, the smart camera may periodically send a password acquiring request to the server. After receiving the password acquiring request sent by the smart camera, the server may randomly generate a piece of string as the token, and send the token to each of the terminal and the smart camera (e.g., simultaneously).

For example, the smart camera may send the password acquiring request to the server once every hour.

In a second method, the server may periodically generate the token, and send the token to each of the terminal and the smart camera (e.g., simultaneously).

For example, the server may issue the token to the terminal and the smart camera once every hour. A validity period of the token may be one hour.

According to the above embodiment, the token received by the terminal may be randomly generated by the server after the server receives the password acquiring request sent by the smart camera. The token may be sent by the server to each of the terminal and the smart camera (e.g., simultaneously). Alternatively, the token may be periodically generated by the server and sent by the server to each of the terminal and the smart camera (e.g., simultaneously).

In one embodiment, the server sends the token to each of the terminal and the smart camera simultaneously, such that after the smart camera receives the token, the smart camera may use the token to verify the access password included in the access request received from the terminal, when receiving the access request.

In addition, after receiving the token issued by the server, the terminal may also receive the validity period of the token issued by the server.

In step 530, it is determined whether the validity period of the token has lapsed. If the validity period of the token has not lapsed, step 540 is executed; otherwise, step 560 is executed.

In step 540, it is determined that the access password is successfully verified.

In an embodiment of the present disclosure, if the validity period of the token has not lapsed, which indicates that the token is still valid, the token may be used for verification. If the validity period of the token has lapsed, which indicates that the token is invalid, the token cannot be used for verification.

In step 550, the access by the terminal is allowed, and the process ends.

In step 560, the access by the terminal is declined, and the process ends.

In the above embodiment, the first access request carrying the access password sent by the terminal is received through the local area network. It is determined whether the access password is the same as the token stored locally and issued by the terminal. If the access password is the same as the token, it is further determined whether the validity period of the token has lapsed. If the validity period of the token has not lapsed, and if it is determined that access password is successfully verified, the access by the terminal is allowed. In the disclosed embodiment, the smart camera cannot allow access by the terminal after the validity period of the token has lapsed, thereby improving the safety and reliability of accessing the smart camera.

Figure 6:
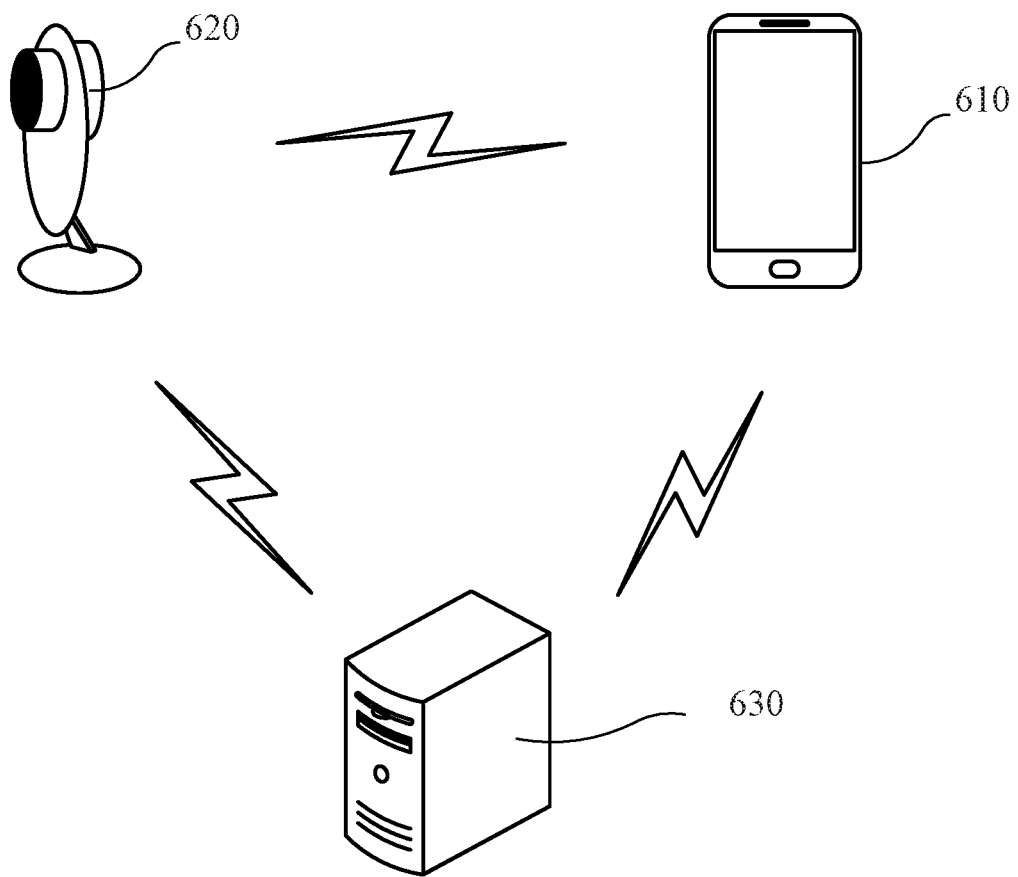
FIG. 6 shows a schematic diagram illustrating an application scenario of a method for accessing a smart camera according to an exemplary embodiment of the present disclosure.

FIG. 6 shows a schematic diagram illustrating an application scenario of a method for accessing a smart camera according to an embodiment of the present disclosure. The application scenario includes a smart phone 610 used as a terminal 610, a smart camera 620, and a server 630.

When a user needs to access the smart camera 620 via the smart phone 610, the smart phone 610 may detect access media for accessing the smart camera 620.

The smart phone 610 generates a first access request carrying an access password after detecting that the access media is a local area network. The smart phone 610 sends the first access request to the smart camera 620 through the local area network. The smart camera 620 verifies the access password carried in the first access request after receiving the first access request sent by the terminal 610 through the local area network. The smart camera 620 allows access by the terminal 610 if the access password is successfully verified.

The access password may be an access password input by the user or a token issued by the server.

In the application scenario shown in FIG. 6, the specific process of accessing the smart camera has been described above in connection with FIGS. 1-5, which is not repeated.

Corresponding to embodiments of the method for accessing a smart camera, the present disclosure further provides embodiments of a device for accessing a smart camera.

Figure 7:
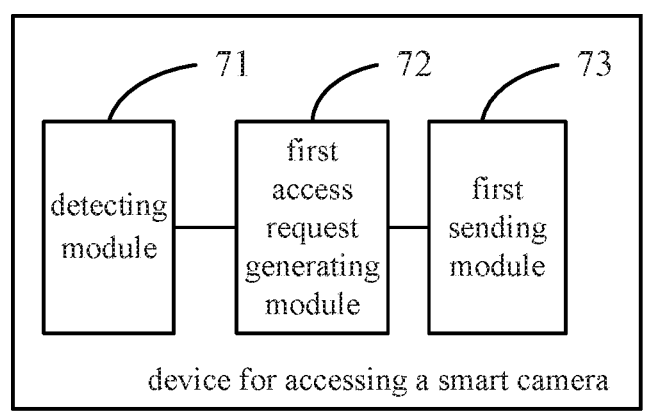
FIG. 7 shows a block diagram of a device for accessing a smart camera according to an exemplary embodiment of the present disclosure.

FIG. 7 shows a block diagram of a device for accessing a smart camera according to an exemplary embodiment of the present disclosure. The device may be implemented in or as a terminal and used for executing the method for accessing a smart camera, as shown in FIG. 1. The device includes a detecting module 71, a first access request generating module 72, and a first sending module 73.

The detecting module 71 is configured to detect access media for accessing a smart camera.

The first access request generating module 72 is configured to generate a first access request corresponding to the access media, when detecting that the access media is a local area network. The first access request carries an access password.

The first sending module 73 is configured to send the first access request to the smart camera, such that the smart camera allows access after successfully verifying the access password carried in the first access request.

In the above embodiment, by detecting the access media for accessing the smart camera, generating the corresponding first access request carrying the access password when detecting that the access media is the local area network, and sending the first access request to the smart camera to enable the smart camera to allow access after the access password in the first access request is successfully verified by the smart camera, the smart camera may be accessed by adopting an access authentication mechanism based on local devices, when the terminal and the smart camera are located in the same local area network but cannot access the Internet. In the disclosed embodiment, safety of accessing the smart camera is improved, user's personal requirement for accessing the smart camera is satisfied, and user experience is improved.

Figure 8:
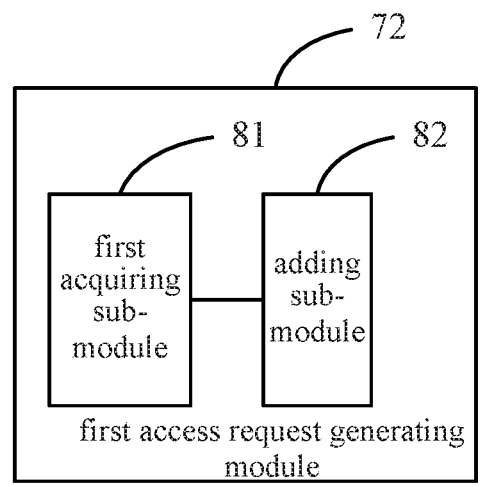
FIG. 8 shows a block diagram of another device for accessing a smart camera according to an exemplary embodiment of the present disclosure.

FIG. 8 shows a block diagram of another device for accessing a smart camera according to an exemplary embodiment of the present disclosure. As shown in FIG. 8, the first access request generating module 72 shown in FIG. 7 includes a first acquiring sub-module 81 and an adding sub-module 82.

The first acquiring sub-module 81 is configured to acquire the access password.

The adding sub-module 82 is configured to add the access password into the first access request.

Figure 9:
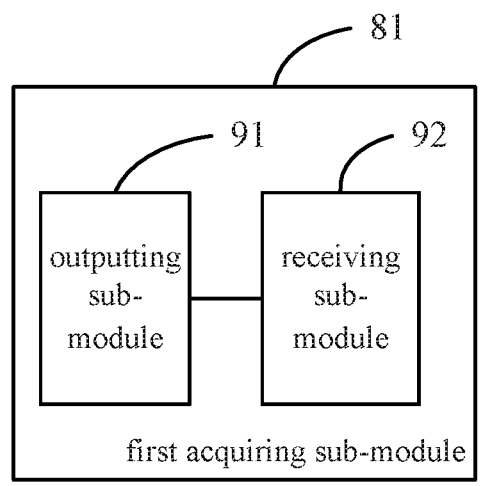
FIG. 9 shows a block diagram of another device for accessing a smart camera according to an exemplary embodiment of the present disclosure.

FIG. 9 shows a block diagram of another device for accessing a smart camera according to an exemplary embodiment of the present disclosure. FIG. 9 shows the first acquiring sub-module 81 shown in FIG. 8. In this embodiment, the access password is an access password input by a user, and the first acquiring sub-module 81 includes an outputting sub-module 91 and a receiving sub-module 92.

The outputting sub-module 91 is configured to output or display an access password input interface.

The receiving sub-module 92 is configured to receive the access password input by the user through the access password input interface.

Figure 10:
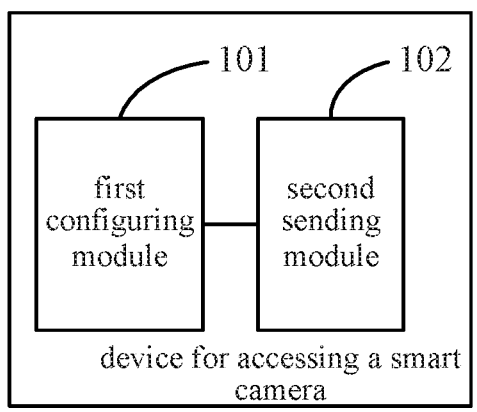
FIG. 10 shows a block diagram of another device for accessing a smart camera according to an exemplary embodiment of the present disclosure.

FIG. 10 shows a block diagram of another device for accessing a smart camera according to an exemplary embodiment of the present disclosure. The embodiment shown in FIG. 10 is based on the embodiment shown in FIG. 9. In the embodiment shown in FIG. 10, the device further includes a first configuring module 101 and a second sending module 102.

The first configuring module 101 is configured to configure or set an appointed password with the smart camera before the smart camera is accessed.

The second sending module 102 is configured to send the appointed password to the smart camera, such that the smart camera stores the appointed password, and allows access after determining that the appointed password is the same as the access password input by the user and included in the first access request.

Figure 11:
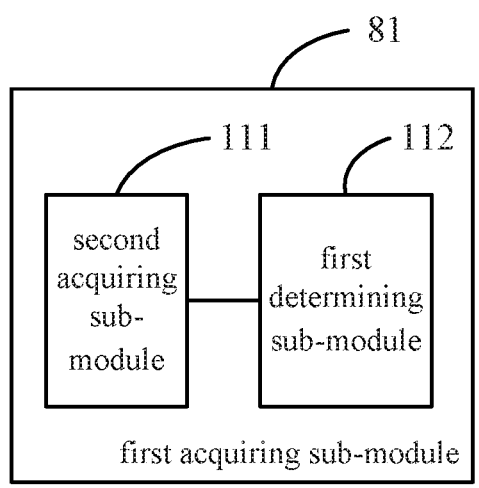
FIG. 11 shows a block diagram of another device for accessing a smart camera according to an exemplary embodiment of the present disclosure.

FIG. 11 shows a block diagram of another device for accessing a smart camera according to an exemplary embodiment of the present disclosure. The embodiment shown in FIG. 11 is based on the embodiment shown in FIG. 8. In the embodiment shown in FIG. 11, the access password is a token issued by a server, and the first acquiring sub-module 81 includes a second acquiring sub-module 111 and a first determining sub-module 112.

The second acquiring sub-module 111 is configured to acquire the token issued by the server.

The first determining sub-module 112 is configured to determine the token as the access password.

In the above embodiment, the access password may be acquired in various manners. The acquired access password is added into the first access request and used by the smart camera for performing a safety verification. The access password may be a password preset by the terminal, a password input by the user, or a password issued by the server. The scope of sources of the access password is expanded, thereby improving the efficiency and availability of accessing the smart camera.

Figure 12:
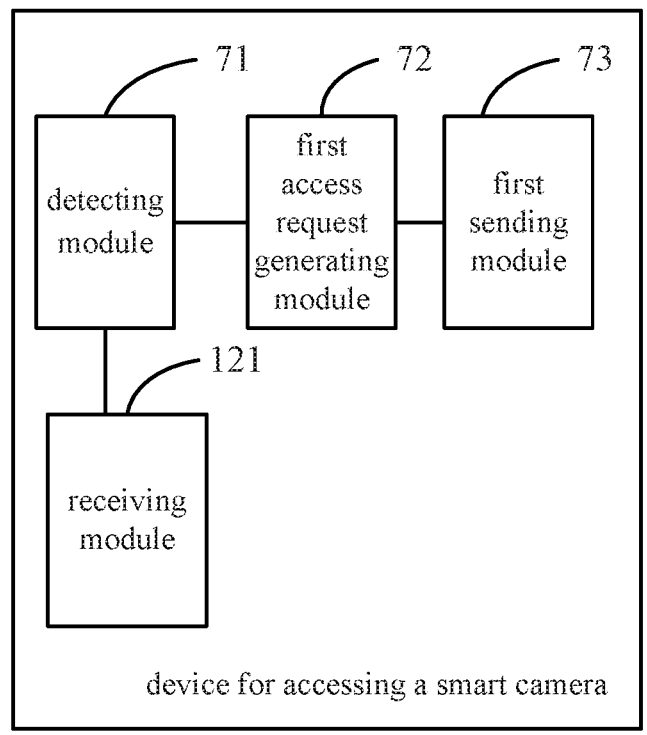
FIG. 12 shows a block diagram of another device for accessing a smart camera according to an exemplary embodiment of the present disclosure.

FIG. 12 shows a block diagram of another device for accessing a smart camera according to an exemplary embodiment of the present disclosure. The embodiment shown in FIG. 12 is based on the embodiment shown in FIG. 11. In the embodiment shown in FIG. 12, the device further includes a receiving module 121.

The receiving module 121 is configured to receive the token and a validity period of the token issued by the server. The token is randomly generated by the server after the server receives a password acquiring request sent by the smart camera. The token is sent by the server to each of a terminal and the smart camera (e.g., simultaneously). Alternatively, the token is periodically generated by the server, and sent by the server to each of a terminal and the smart camera (e.g., simultaneously).

In the above embodiment, a corresponding second access request is generated when detecting that the access media includes the Internet. The second access request carries or includes a user account and a device identification of the smart camera. The second access request is sent to the server, such that the server transfers the second access request to the smart camera after determining that the user account and the device identification of the smart camera in the second access request are bounded to each other. In this manner, the terminal gives priority to adopting the authentication mechanism based on the server when the terminal can access the Internet, such that the speed of accessing the smart camera may be further improved.

Figure 13:
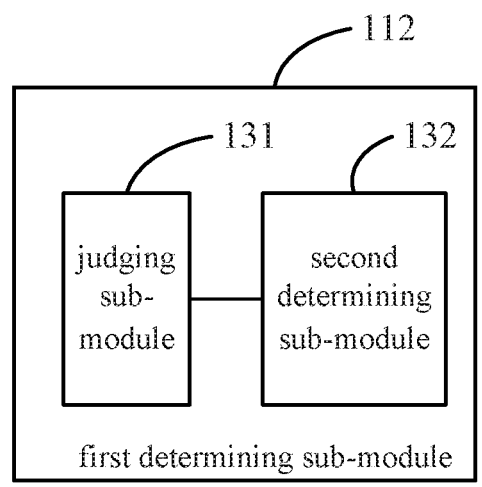
FIG. 13 shows a block diagram of another device for accessing a smart camera according to an exemplary embodiment of the present disclosure.

FIG. 13 shows a block diagram of another device for accessing a smart camera according to an exemplary embodiment of the present disclosure. The embodiment shown in FIG. 13 is based on the embodiment shown in FIG. 12. In this embodiment, the first determining sub-module 112 includes a judging sub-module 131 and a second determining sub-module 132.

The judging sub-module 131 is configured to judge or determine whether the validity period of the token has lapsed.

The second determining sub-module 132 is configured to determine the token as the access password if the validity period of the token has not lapsed.

In the above embodiment, after the token is no longer valid, the terminal cannot access the smart camera through the local area network. The terminal waits for another valid token to be issued by the server. In this way, the safety and reliability of accessing the smart camera are improved.

Figure 14:
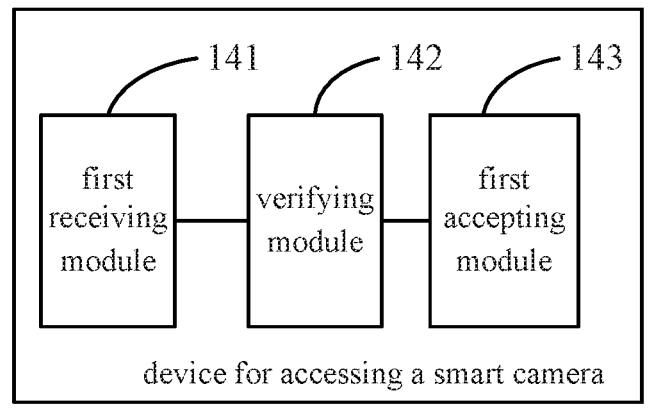
FIG. 14 shows a block diagram of another device for accessing a smart camera according to an exemplary embodiment of the present disclosure.

FIG. 14 shows a block diagram of a device for accessing a smart camera according to another exemplary embodiment of the present disclosure. The device may be implemented in or as a smart camera. The smart camera is a smart camera to be accessed and used for executing the disclosed method for accessing a smart camera shown, such as the embodiment shown in FIG. 4. The device includes a first receiving module 141, a verifying module 142, and a first accepting module 143.

The first receiving module 141 is configured to receive a first access request sent by a terminal through a local area network, the first access request carrying or including an access password.

The verifying module 142 is configured to verify the access password.

The first accepting module 143 is configured to allow access by the terminal if the access password is successfully verified.

In the above embodiment, by receiving the first access request carrying the access password sent by the terminal through a local area network, verifying the access password, and allowing access by the terminal if the access password is successfully verified, the first access request may be verified by adopting an access authentication mechanism based on local devices, when the smart camera and the terminal are located in the same local area network but cannot access the Internet. In the disclosed embodiment, safety of accessing the smart camera is improved, user's personal requirement for accessing the smart camera is satisfied, and user experience is improved.

Figure 15:
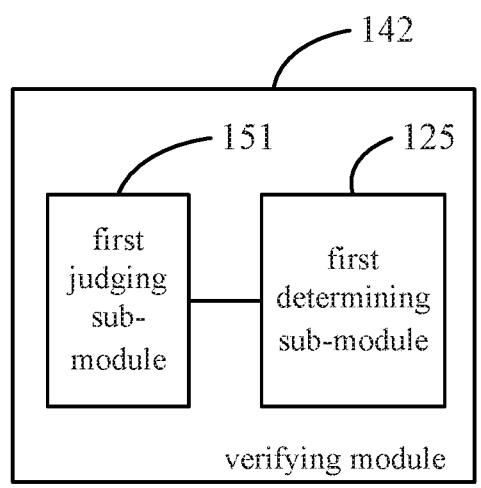
FIG. 15 shows a block diagram of another device for accessing a smart camera according to an exemplary embodiment of the present disclosure.

FIG. 15 shows a block diagram of another device for accessing a smart camera according to an exemplary embodiment of the present disclosure. The embodiment shown in FIG. 15 is based on the embodiment shown in FIG. 14. In the embodiment shown in FIG. 15, the verifying module 142 includes a first judging sub-module 151 and a first determining sub-module 152.

The first judging sub-module 151 is configured to judge or determine whether the access password is the same as an appointed password stored locally.

The first determining sub-module 152 is configured to determine that the access password is successfully verified if the access password is the same as the appointed password.

Figure 16:
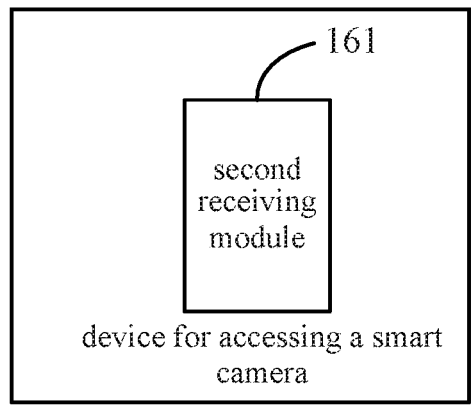
FIG. 16 shows a block diagram of another device for accessing a smart camera according to an exemplary embodiment of the present disclosure.

FIG. 16 shows a block diagram of another device for accessing a smart camera according to an exemplary embodiment of the present disclosure. The embodiment shown in FIG. 16 is based on the embodiment shown in FIG. 15. In the embodiment shown in FIG. 16, the device further includes a second receiving module 161.

The second receiving module 161 is configured to receive the appointed password sent by the terminal. The appointed password is a password appointed between the terminal and the smart camera.

Figure 17:
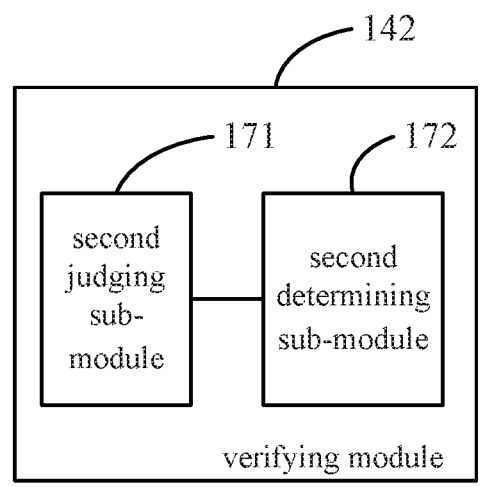
FIG. 17 shows a block diagram of another device for accessing a smart camera according to an exemplary embodiment of the present disclosure.

FIG. 17 shows a block diagram of another device for accessing a smart camera according to an exemplary embodiment of the present disclosure. The embodiment shown in FIG. 17 is based on the embodiment shown in FIG. 14. In the embodiment shown in FIG. 17, the verifying module 142 includes a second judging sub-module 171 and a second determining sub-module 172.

The second judging sub-module 171 is configured to judge or determine whether the access password is the same as a token stored locally. The token may be a password issued by a server.

The second determining sub-module 172 is configured to determine that the access password is successfully verified if the access password is the same as the token.

Figure 18:
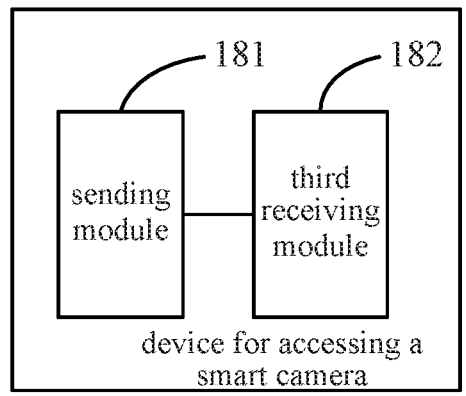
FIG. 18 shows a block diagram of another device for accessing a smart camera according to an exemplary embodiment of the present disclosure.

FIG. 18 shows a block diagram of another device for accessing a smart camera according to an exemplary embodiment of the present disclosure. The embodiment shown in FIG. 18 is based on the embodiment shown in FIG. 17. In the embodiment shown in FIG. 18, the device further includes a sending module 181 and a third receiving module 182.

The sending module 181 is configured to send a password acquiring request to the server, such that the server randomly generates the token according to the password acquiring request and sends the token to each of the terminal and the smart camera (e.g., simultaneously).

The third receiving module 182 is configured to receive the token and a validity period of the token issued by the server.

Figure 19:
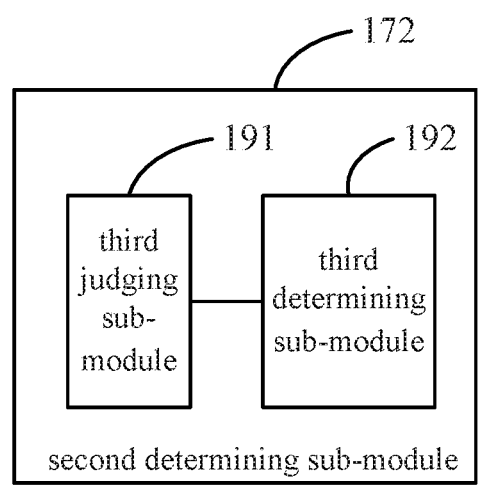
FIG. 19 shows a block diagram of another device for accessing a smart camera according to an exemplary embodiment of the present disclosure.

FIG. 19 shows a block diagram of another device for accessing a smart camera according to an exemplary embodiment of the present disclosure. The embodiment shown in FIG. 19 is based on the embodiment shown in FIG. 18. In the embodiment shown in FIG. 19, the second determining sub-module 172 further includes a third judging sub-module 191 and a third determining sub-module 192.

The third judging sub-module 191 is configured to judge or determine whether the validity period of the token has lapsed if the access password is the same as the token.

The third determining sub-module 192 is configured to determine that the access password is successfully verified if the validity period of the token has not lapsed.

In the above embodiment, after the token is no longer valid, the smart camera cannot allow access, thereby improving the safety and reliability of accessing the smart camera.

Corresponding to FIG. 7, the present disclosure further provides another device for accessing the smart camera. The device may be implemented in or as the terminal. The device may include a processor and a memory configured to store instructions executable by the processor. The processor may be configured to detect access media for accessing a smart camera; generate a first access request corresponding to the access media when detecting that the access media is a local area network. The first access request may carry an access password. The processor may also be configured to send the first access request to the smart camera, such that the smart camera allows access after successfully verifying the access password in the first access request.

Corresponding to FIG. 14, the present disclosure further provides another device for accessing the smart camera. The device may be implemented in or as the smart camera. The device may include a processor and a memory configured to store instructions executable by the processor. The processor is configured to receive a first access request sent from a terminal through a local area network, the first access request carrying an access password, verify the access password, and if the verification is successful, allow access by the terminal.

With respect to the apparatuses disclosed in the above embodiments, the specific manners for performing functions and operations by individual units included in the apparatuses have been described above in detail in connection with the embodiments of the disclosed methods.

Embodiments of the devices correspond to embodiments of the methods. For descriptions of the disclosed devices, reference is made to corresponding descriptions of the embodiments of the methods. The disclosed embodiments of the devices are exemplary. Units described as separate components may or may not be physically separated. Components shown as units may or may not be physical units. In other words, units may be located at one location, or distributed at a plurality of network locations. Some or all of the modules may be selected to achieve the objective of the disclosed embodiments according to actual requirements. Those skilled in the art may understand and implement the present disclosure without making excessive efforts.

Figure 20:
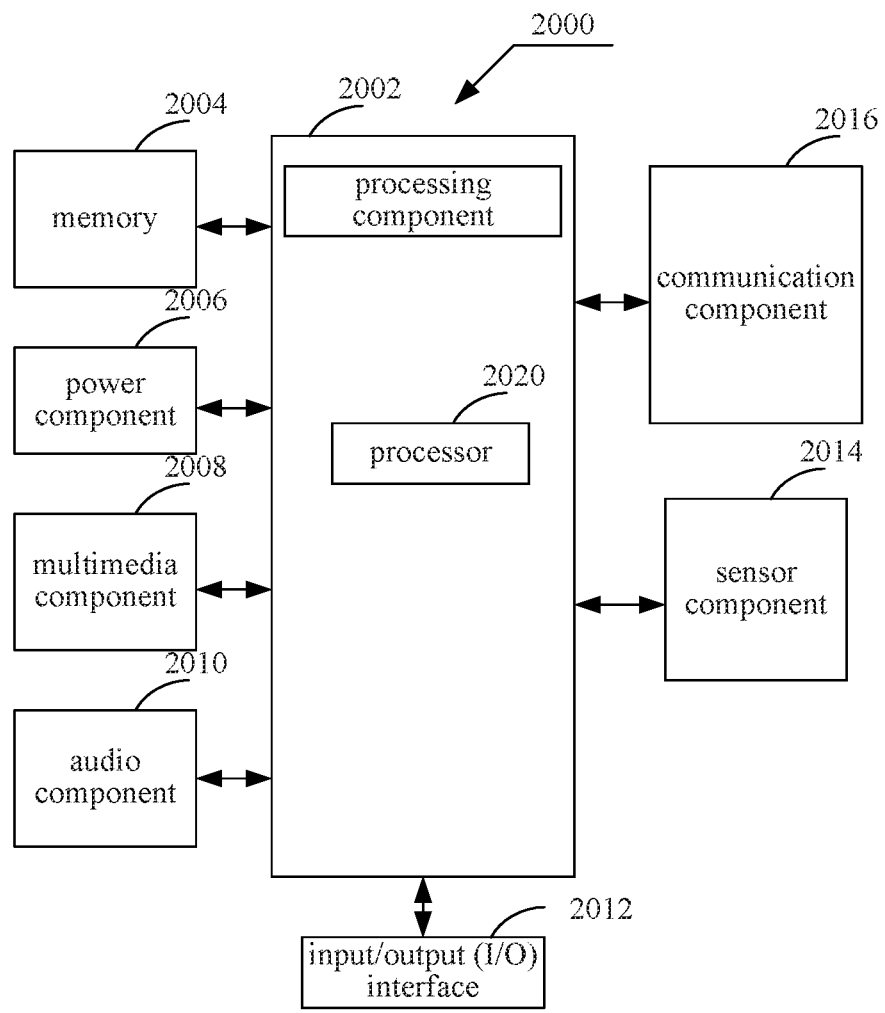
FIG. 20 shows a block diagram of a device for accessing a smart camera according to an exemplary embodiment of the present disclosure.

FIG. 20 shows a block diagram of a device 2000 for accessing a smart camera according to an exemplary embodiment of the present disclosure. The device 2000 may be implemented on the terminal side (e.g., as at least one part of the terminal). For example, the device 2000 may be a mobile phone, a computer, a digital broadcasting terminal, a messaging device, a game console, a tablet device, a medical device, exercise equipment, and a personal digital assistant, etc.

Referring to FIG. 20, the device 2000 includes one or more of following components: a processing component 2002, a memory 2004, a power component 2006, a multimedia component 2008, an audio component 2010, an input/output (I/O) interface 2012, a sensor component 2014, and a communication component 2016.

The processing component 2002 controls overall operations of the device 2000, such as the operations associated with display, telephone calls, data communications, camera operations, and recording operations. The processing component 2002 includes one or more processors 2020 configured to execute instructions to perform all or some of the steps included in the disclosed methods. Moreover, the processing component 2002 may include one or more modules configured to facilitate the interaction between the processing component 2002 and other components. For instance, the processing component 2002 may include a multimedia module configured to facilitate the interaction between the multimedia component 2008 and the processing component 2002.

The memory 2004 is configured to store various types of data to support the operation of the device 2000. Examples of such data include instructions for any applications or methods operated on the device 2000, contact data, phonebook data, messages, pictures, video, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 2006 provides power to various components of the device 2000. The power component 2006 may include a power management system, one or more power sources, and any other components associated with the generation, management, and distribution of power in the device 2000.

The multimedia component 2008 includes a screen providing an output interface between the device 2000 and the user. In some embodiments, the screen may include a liquid crystal display and a touch panel. If the screen includes the touch panel, the screen may be implemented as a touch screen to receive input signals from the user. The touch panel includes one or more touch sensors configured to sense touches, swipes, and other gestures on the touch panel. The touch sensors may not only sense a boundary of a touch or swipe action, but also sense a duration time and a pressure associated with the touch or swipe action. In some embodiments, the multimedia component 2008 includes a front camera and/or a rear camera. The front camera and the rear camera may receive external multimedia data while the device 2000 is in an operation mode, such as a photographing mode or a video mode. Each of the front camera and the rear camera may have a fixed optical lens system or have focus and optical zoom capability.

The audio component 2010 is configured to output and/or input audio signals. For example, the audio component 2010 includes a microphone configured to receive an external audio signal when the device 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker configured to output audio signals.

The I/O interface 2012 provides an interface between the processing component 2002 and peripheral interface modules, such as a keyboard, a click wheel, buttons, and the like. The buttons may include, but are not limited to, a home button, a volume button, a starting button, and a locking button.

The sensor component 2014 includes one or more sensors configured to provide status assessments of various aspects of the device 2000. For instance, the sensor component 2014 may detect an open/closed status of the device 2000 and relative positioning of components (e.g., the display and the keypad of the device 2000). The sensor component 2014 may also detect a change in position of the device 2000 or of a component in the device 2000, a presence or absence of user contact with the device 2000, an orientation or an acceleration/deceleration of the device 2000, and a change in temperature of the device 2000. The sensor component 2014 may include a proximity sensor configured to detect the presence of nearby objects without any physical contact. The sensor component 2014 may also include a light sensor, such as a CMOS or CCD image sensor, for use in imaging applications. In some embodiments, the sensor component 2014 may also include an accelerometer sensor, a gyroscope sensor, a magnetic sensor, a pressure sensor, or a temperature sensor.

The communication component 2016 is configured to facilitate wired or wireless communication between the device 2000 and other devices. The device 2000 can access a wireless network based on a communication standard, such as WIFI, 2G, or 3G, 4G, or a combination thereof. In one exemplary embodiment, the communication component 2016 receives a broadcast signal or broadcast associated information from an external broadcast management system via a broadcast channel. In one exemplary embodiment, the communication component 2016 further includes a near field communication (NFC) module configured to facilitate short-range communications. For example, the NFC module may be implemented based on a radio frequency identification (RFID) technology, an infrared data association (IrDA)

technology, an ultra-wideband (UWB) technology, a BLUETOOTH® (BT) technology, and other technologies.

In exemplary embodiments, the device 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 2004 including instructions. The above instructions are executable by the processor 2020 in the device 2000, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for accessing a smart camera by a terminal, comprising:
    detecting, by the terminal, access media for accessing the smart camera;
    generating, by the terminal, an access request corresponding to the access media when detecting that the access media is a local area network, wherein the access request carries an access password, and the access password comprises a token issued by a server; and
    sending, by the terminal, the access request to the smart camera, such that the smart camera allows access after successfully verifying the access password in the access request,
    wherein the method further comprises:
    receiving, at the same time of the server sending the token to the smart camera, the token and a validity period of the token issued by the server when the server periodically generates the token, and storing the token;
    judging whether the validity period of the token has passed; and
    when the validity period of the token has not passed, determining the token as the access password, updating the token stored previously, and adding the token in the access request.

2. The method according to claim 1, wherein generating an access request corresponding to the access media comprises:
    adding the access password into the access request.

3. The method according to claim 1, wherein the method further comprises:
    receiving, at the same time of the server sending the token to the smart camera, the token and the validity period of the token issued by the server when the server randomly generates the token after the server receives a password acquiring request sent by the smart camera.

4. A method for accessing a smart camera, comprising:
    receiving, by the smart camera, an access request sent by a terminal through a local area network, wherein the access request carries an access password, the access password comprising a token issued by a server;
    verifying, by the smart camera, the access password, comprising:
        receiving, at the same time of the server sending the token to the terminal, the token and a validity period of the token issued by the server when the server periodically generates the token, and storing the token;
        judging whether the access password is the same as the token locally stored;
        judging whether the validity period of the token has passed if the access password is the same as the token; and
        when the validity period of the token has not passed, determining that the access password is verified successfully; and
    allowing, by the smart camera, access by the terminal if the access password is successfully verified,
    wherein the method further includes:
    judging, by the terminal, whether the validity period of the token has passed; and
    when the validity period of the token has not passed, determining, by the terminal, the token as the access password, updating, by the terminal, a token stored previously, and adding, by the terminal, the token in the access request.

5. The method according to claim 4, further comprising:
    sending a password acquiring request to the server; and
    receiving, at the same time of the server sending the token to the terminal, the token and the validity period of the token issued by the server when the server randomly generates the token according to the password acquiring request.

6. A device for accessing a smart camera, comprising:
    a processor; and
    a memory configured to store instructions executable by the processor;
    wherein the processor is configured to:
        detect access media for accessing the smart camera;
        generate an access request corresponding to the access media when detecting that the access media is a local area network, wherein the access request carries an access password, the access password comprising a token issued by a server; and
        send the access request to the smart camera, such that the smart camera allows access after successfully verifying the access password in the access request,
    wherein the processor is further configured to:
        receive, at the same time of the server sending the token to the smart camera, the token and a validity period of the token issued by the server when the server periodically generates the token, and store the token;
        judge whether the validity period of the token has passed; and
        when the validity period of the token has not passed, determine the token as the access password, update the token stored previously, and add the token in the access request.

7. The device according to claim 6, wherein the processor is configured to:
   acquire the token issued by the server; and
   determine the token as the access password.

8. The device according to claim 7, wherein the processor is further configured to:
   receive, at the same time of the server sending the token to the smart camera, the token and the validity period of the token issued by the server when the server randomly generates the token the token after the server receives a password acquiring request sent by the smart camera.

\* \* \* \* \*